(12) United States Patent  (10) Patent No.: US 7,393,051 B2
Donaghey  (45) Date of Patent: Jul. 1, 2008

(54) SEAT WITH ADJUSTABLE OMNIDIRECTIONAL SUSPENSION

(75) Inventor: Robert Donaghey, San Diego, CA (US)

(73) Assignee: Air Seat Technologies, Inc., Vista, CA (US)

( * ) Notice: Subject to any disclaimer, the term of this patent is extended or adjusted under 35 U.S.C. 154(b) by 90 days.

(21) Appl. No.: 11/101,145

(22) Filed: Apr. 6, 2005

(65) Prior Publication Data

US 2006/0238014 A1    Oct. 26, 2006

(51) Int. Cl.
*B62J 1/26* (2006.01)
*B62J 1/00* (2006.01)
*B60N 2/40* (2006.01)
*A47C 7/02* (2006.01)

(52) U.S. Cl. ............... 297/199; 297/195.1; 297/200; 297/452.41; 297/DIG. 3

(58) Field of Classification Search ............... 297/199, 297/452.41, DIG. 3, 200, 195.1
See application file for complete search history.

(56) References Cited

U.S. PATENT DOCUMENTS

| 4,175,297 | A | * | 11/1979 | Robbins et al. ..... 297/DIG. 3 X |
| 4,570,676 | A | * | 2/1986 | Nishio et al. ........ 297/DIG. 3 X |
| 4,611,851 | A | * | 9/1986 | Noyes et al. ............... 297/199 |
| 4,655,505 | A | * | 4/1987 | Kashiwamura et al. .............. 297/DIG. 3 X |
| 4,724,560 | A | * | 2/1988 | Christie .................... 5/644 |
| 4,860,397 | A | * | 8/1989 | Gusakov ............. 297/DIG. 3 X |
| 4,957,286 | A | * | 9/1990 | Persons et al. ........... 297/199 X |
| 4,981,131 | A | * | 1/1991 | Hazard ............... 297/DIG. 3 X |
| 5,044,030 | A | * | 9/1991 | Balaton .............. 297/DIG. 3 X |
| 5,121,962 | A | * | 6/1992 | Weber et al. ............ 297/199 X |
| 5,243,722 | A | * | 9/1993 | Gusakov ............. 297/DIG. 3 X |
| 5,304,271 | A | * | 4/1994 | Gusakov .................... 156/145 |
| 5,330,249 | A | * | 7/1994 | Weber et al. ............ 297/199 X |
| 5,419,612 | A | * | 5/1995 | Rassekhi ................... 297/200 |
| 6,012,772 | A | * | 1/2000 | Conde et al. ............ 297/199 X |
| 6,036,271 | A | * | 3/2000 | Wilkinson et al. ..... 297/452.41 |
| 6,152,530 | A |   | 11/2000 | Hsu et al. |
| 6,159,172 | A | * | 12/2000 | Gray et al. .......... 297/452.41 X |
| 6,328,385 | B1 | * | 12/2001 | Lau ........................ 297/452.41 |
| 6,623,080 | B2 | * | 9/2003 | Clapper .................. 297/452.41 |
| 2004/0222684 | A1 | * | 11/2004 | VanSickle .............. 297/452.41 |
| 2005/0046245 | A1 |   | 3/2005 | Yu |

FOREIGN PATENT DOCUMENTS

DE    90 07 148 U1    10/1990
DE    40 33 634 A1     4/1992
EP     0 676 324 A    10/1995

* cited by examiner

*Primary Examiner*—Rodney B. White
(74) *Attorney, Agent, or Firm*—Mintz, Levin, Cohn, Ferris, Glovsky and Popeo, P.C.

(57) ABSTRACT

A seat includes a bladder assembly having a plurality of pneumatic bladders arranged one within another. The compressibility of each pneumatic bladder is based at least in part on a pressure within the pneumatic bladder, and/or on a thickness of an outer layer that defines the shape of the pneumatic bladder. In a configuration, an inner bladder is inflatable independently from an outer bladder, for adjustable, targeted support and compressibility.

16 Claims, 12 Drawing Sheets

SEAT WITH ADJUSTABLE OMNIDIRECTIONAL SUSPENSION

BACKGROUND

Seats are prevalent in a wide variety of technologies, from office chairs to bicycle seats. Several problems with conventional or traditional seats include providing sufficient directional support based on the seating application and/or the form and forces exerted on the seat by its user.

Traditional bicycles, for example, commonly employ a seat that consists of a rigid base. The base may or may not be covered with cushioning material. The cushioning material typically consists of a thin layer of foam padding. These types of seats provide support in a limited number of directions, usually only for a small area of human anatomy, and very little suspension.

One alternative type of seat employs an air bladder. The air bladder includes one or two air bladders positioned between the rigid base and a cover layer, arranged either one in front of the other, or side-by-side. These air bladders, which range in thickness from about 0.5 to 1.5 inches, provides minimal cushioning and no actual suspension, and only cushion alternative sides of a rider's buttocks. This results in a loss of energy due to the compression and decompression alternating between the bladders.

For bicycle applications, the vibrations and shocks one receives from riding, distributed among varying intensity and directions, particularly in off-road riding, are not sufficiently absorbed by traditional or conventional seats. For bicycles and other applications, what is needed is a seat that can offer omni directional shock and vibration absorption and cushioning, that can absorb shocks as large as 8 to 10 inches or more, such as those encountered in real world cycling, and that can be adjustable or reconfigurable for various bicycle riding scenarios or for a variety of rider types, rider ability, rider weight, terrain conditions, and riding style/intentions.

SUMMARY

An improved seat, and a method of forming the same, are disclosed in multiple embodiments. In an embodiment, a seat includes a bladder assembly having a plurality of pneumatic bladders arranged one within another. The compressibility of each pneumatic bladder is based at least in part on a pressure within the pneumatic bladder, and/or on a thickness of an outer layer that defines the shape of the pneumatic bladder.

In an embodiment, a seat includes two or more pneumatic bladders, at least one pneumatic bladder contained within at least one other pneumatic bladder, and wherein each pneumatic bladder has a compressibility that is at least partially independent of a compressibility of all other pneumatic bladders. The compressibility of an outer pneumatic bladder, for example, may be at least dependent on the compressibility of an inner pneumatic bladder.

In another embodiment, a seat assembly includes a plurality of bladder systems. Each bladder system includes a flanged ring having a first annular portion of a first diameter, a second annular portion of a second diameter larger than the first diameter, and an annular flange projecting from the first portion. Each bladder system further includes a pneumatic bladder having an opening configured to circumscribe the annular flange and a body configured to extend up through the first and second portions of the flanged ring, such that the pneumatic bladders are arranged one within another to provide at least one inner bladder and at least one outer bladder.

In another embodiment, a seat assembly includes a pneumatic regulator assembly coupled with the bladder assemblies. The pneumatic regulator assembly includes a plurality of stackable flanged rings, one flanged ring for each of the plurality of bladders, each flanged ring having a first annular portion of a first diameter, a second annular portion of a second diameter larger than the first diameter, and an annular flange projecting from the first portion, wherein the first annular portion of one flanged ring is configured to mate into the second annular portion of another flanged ring, and wherein the annular flange is configured for being circumscribed by an opening of a pneumatic bladder. Each flanged ring can include an air passage for receiving gas or fluid pressure to inflate the associated pneumatic bladder. The pneumatic regulator assembly further includes a cap that is securable to one of the flanged rings to cover the first annular portion and to secure the opening of the pneumatic bladder to the annular flange. The cap can also have an air passage for receiving gas or fluid pressure to inflate one or more of the pneumatic bladders.

In an embodiment, a seat assembly includes a support basket that at least partially cradles the outermost pneumatic bladder. The support basket can include a plurality of at least partially overlapping, flexible curved support plates, and can include a base plate connected to the plurality of the support plates. The seat assembly can further include one or more mounting rails connected with the base plate and configured for being mounted to an object, such as the frame of a bicycle, or other vehicle seat, or even to a stand for an office chair configuration.

The seat and seat assemblies disclosed herein provide multidirectional suspension and compressibility, and allow compressibility to be configurable for any type of user and/or activity. For example, the seat can be adapted for any type of bicycle riding form, where the outer bladder is compressed by the leg coming down and results in a pressure change that helps lift the opposite leg in its upward motion, thus there is very little energy lost for the rider. The seat can be adapted for a wide range of suspension, and compressible to a range of one to more than eight inches. The seat also provides an adjustable rate of compression.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document discloses a seat and seat assembly that is particularly suited for vehicles cycles and other single-seat vehicles. The seat absorbs and distributes large shocks and vibrations, allowing eight or more inches of adjustable compressibility and active vertical suspension, and an adjustable amount of side to side suspension and support.

In an embodiment, the seat includes two or more bladders in a layered configuration to prevent a bottoming-out of the pneumatic pressure, and to provide a backup suspension in case of a rupture of an outer bladder. The two or more bladders directs energy from a compressive load toward the center of the bladders. The seat is adaptable to most cycles, such as bicycles and motorcycles, as well as other vehicles such as snowmobiles, all-terrain vehicles and other motor vehicles. The bladder assembly can be provided on its own, or covered by other material including, but not limited to, leather, vinyl, padding such as foam, or other padding or stability-enhancing material.

In an embodiment, a seat includes multiple pneumatic bladders that work together to fit the anatomy of the human form in a functionally targeted way, with a preferably soft (i.e. low pressure) outer or exterior bladder that interfaces the soft tissues of the human legs, buttocks and genital area, and one or more relatively harder (i.e. high pressure) inner or interior bladders that interface the relatively harder tissues of the human gluteal fold, hip bones and perineum under load, where the bladders are compressible under the particular distributed load of the user and as a result of shocks experienced in the normal course of an action such as piloting or riding a vehicle such as a bicycle. The rate of vertical compression is adjustable by the relative density of the bladders, and the suspension and support is augmented by a number of side support plates of variable density and/or number.

Figure 1:
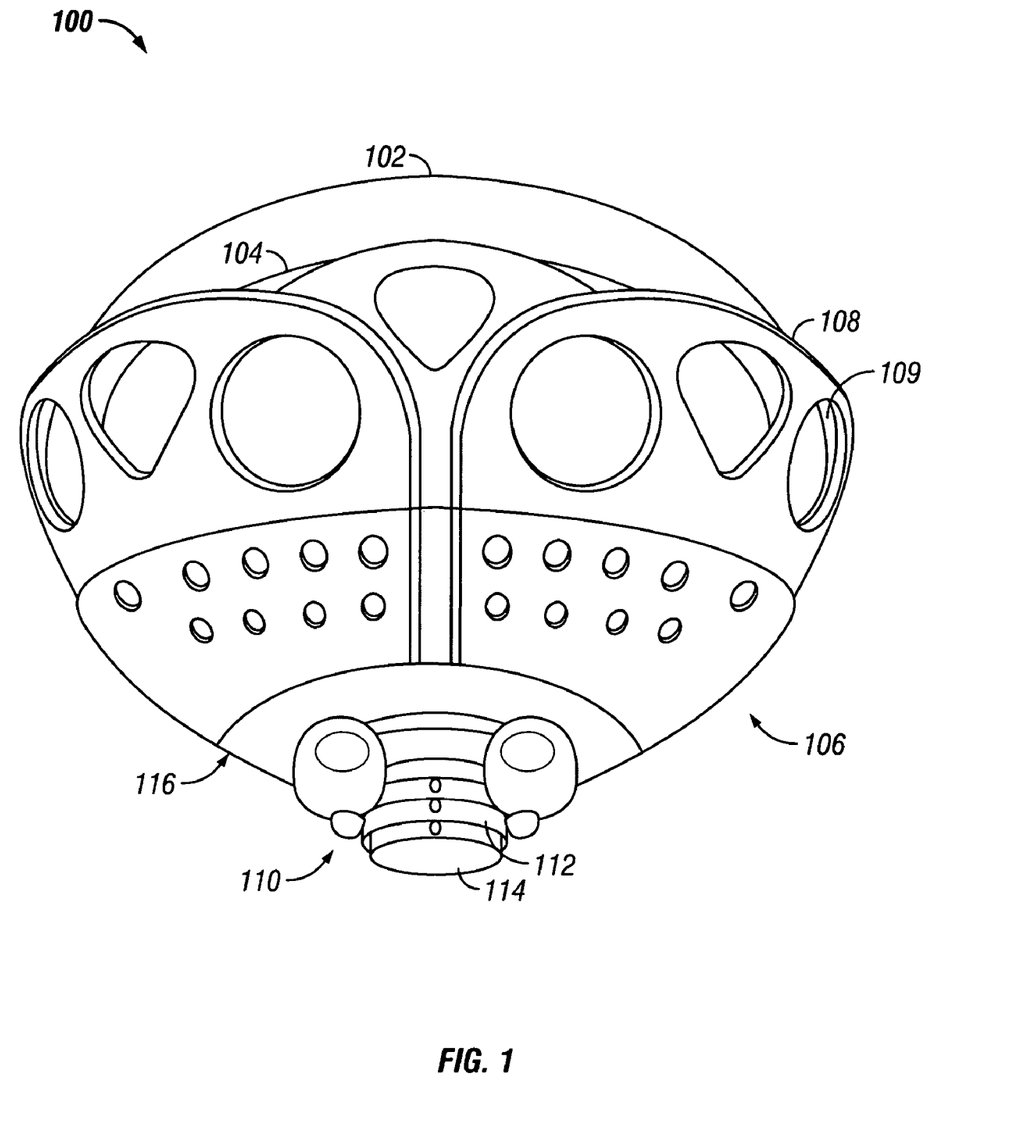
FIG. 1 is a rear perspective view of a seat assembly.

FIG. 1 is a rear perspective view of a seat assembly 100 having an outer pneumatic bladder 102 that encompasses an inner pneumatic bladder 104. The bladders 102 and 104 are cradled in a flexible support basket 106. The support basket 106 includes one or more flexible support plates 108 which are curved inward toward the bladders 102 and 104. Where two or more support plates 108 are used, the support plates can be at least partially overlapping for adjustable sizing of the basket 106, or substantially completely overlapping for adjusting to various pressures and/or loads. For instance, each support plate 108 can have a pressure tolerance of 100 lbs or less, and thus can be doubled up for 200 lbs total pressure tolerance, overlapped in triplicate for 300 lbs total pressure tolerance, etc.

The support plates 108 of the support basket 106 culminate at a bottom point, which is connected to a pneumatic regulator assembly 110. The pneumatic regulator assembly 100 is formed of one or more flanged rings 112 in a stacked configuration, and capped and secured by a cap 114. The pneumatic regulator assembly 110 includes an air passage for regulating an amount of pneumatic force applied to a respective bladder for inflation or deflation of the bladder. The air passage may include a valve.

Each bladder 102, 104 has a compressibility, which is based at least in part on a thickness and resiliency of the bladder material, on the internal pressure within the bladder, and on the presence of other bladder(s) enclosed within. In one embodiment, the inner pneumatic bladder 104 is inflated to a first pressure, and the outer pneumatic bladder 102 substantially surrounding or enclosing the inner pneumatic bladder 104 is inflated to a second pressure. The second pressure can be different from the first pressure, and preferably lower, for providing a greater or lesser degree of shock absorption for the outer bladder 102 until it is compressed against the one or more higher-pressure inner bladder(s) 104 for more directed support against harder, more dense tissue of the user. Either bladder 102, 104 can be inflated to a particular pressure for a particular application or bicycle riding environment, or for a particular body type. One, two, three or more bladders can be used, one bladder being enclosed by one or more other bladders. In one embodiment, the outer bladder 102 has thinner walls and lower pressure, and one or more inner bladder(s) 104 have thicker walls and higher pressures.

The bladders 102, 104 of the seat assembly 100 can be made of any soft, supple, flexible and resilient material, such as rubber. The material can have any thickness suitable to maintaining a particular a shape of the bladder and defining a particularly sized cavity within the bladder, and for maintaining a desired total internal pneumatic pressure in the cavity. The thickness and/or density of the bladders 102, 104 may be varied in order to make them more or less supple or rigid, and to provide a greater or lesser amount of compressibility for each of the bladders 102, 104.

The flexible support basket 106, and/or flexible support plates 108 thereof, can be formed of any flexible but resilient material such as metal, plastic, nylon, or fiberglass, or other composite material. Each support plate 108 can include one or more apertures 109 that are positioned and arranged to provide targeted flexible bending points within the surface of the support plate 108. The bladders 102 and 104, in combination with the support plates 108, provide variable suspension, variable rates of compression, and variable side-to-side movement and support.

Figure 2A:
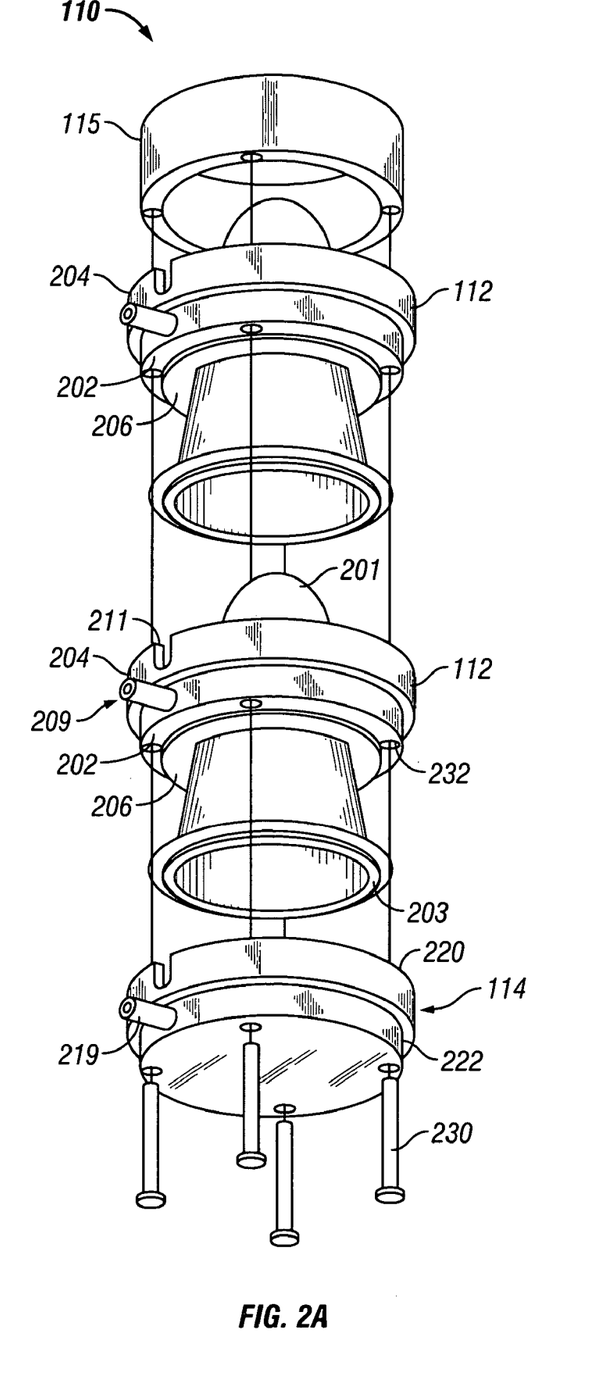
FIG. 2A is an exploded view of a pneumatic regulator assembly for the seat.

FIG. 2A shows an exploded view of a pneumatic regulator assembly 110, in accordance with a specific exemplary embodiment. The regulator assembly 100 includes one or more flanged rings 112 that are formed and configured for stacked assemblage. Each flanged ring 112 includes a first annular portion 202 having a first diameter and a second annular portion 204 having a second diameter that is larger than the first diameter. Each flanged ring 112 further includes an annular flange 206 projecting downward from the first annular portion 202.

To form the seat, a deflated bladder 201 is pushed up through the flanged ring 112 until an opening 203 of the bladder 201 contacts the flange 206. In one embodiment, the opening 203 of the bladder 201 can be stretched outward and over the flange 206. Alternatively, the opening 203 can include a rigid ring end adapted to fit on or around the flange 206. As each flanged ring 112 is stacked on one another, i.e. a first annular portion 202 of an upper flanged ring 112 mating with a second annular portion 204 of a lower flanged ring 112, the bladder of the lower flanged ring 204 extends inside the bladder of the upper flanged ring 204, such that inflation of the bladders results in a bladder-in-bladder seat arrangement shown in FIG. 1. Any number of bladders 201 and flanged rings can be used.

The pneumatic regulator assembly 110 also includes a cap 114 that is securable to a flanged ring 112 above it, to cover the first annular portion 202 and to secure the opening 203 of the pneumatic bladder 201 to the annular flange 206. The cap 114 further includes an air valve 219 for receiving/expelling gas or fluid pressure to inflate/deflate bladder associated with the flanged ring 112 immediately above the cap 114. Likewise, each flanged ring 112 is provided with an air passage 209 for inflating/deflating the bladder associated with the flanged ring 112 above it, in the orientation shown. The air passage 209 can be accommodated by a cutout 211 in the peripheral edge of the second annular portion 204 of a lower flanged ring 112. A top flanged ring 112 can be mated to a cylinder 115 that is part of or connected to the support basket of the seat assembly 100, shown in FIG. 1.

The cap 114 can be secured to the pneumatic regulator assembly 110 by a number of bolts 230 that extend through apertures in the cap and into threaded bores 232 in the flanged ring 112 above the cap 114. The cap 114 can include a first annular portion 222 and a second annular portion 220 that are comparable in size and shape to the first annular portion 202 and second annular portion 204, respectively, of a flanged ring 112. The first annular portion 202 protrudes from the second annular portion 204 as a flange. Accordingly, the components of the pneumatic regulator assembly 110 can be made of uniform size, material, etc., for interchangeability and economy of components. These components can be formed of plastic, aluminum, steel, graphite or other composite material, or any other sturdy, rigid material. Pressure is sealed in each bladder(s) 201 by the compression of the flexible ring of the opening 203 of the bladder 201 between the first annular portion 202 of one flanged ring 112 and the second annular portion 204 of another flanged ring 112 in a stacked arrangement.

Figure 2B:
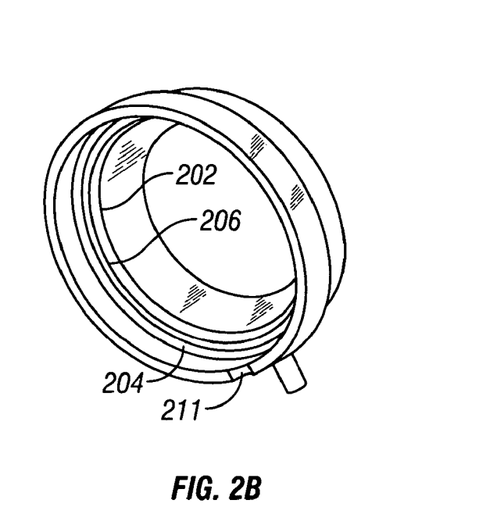
FIG. 2B is a perspective view of an interior of a flanged ring for the pneumatic regulator assembly.

FIG. 2B is a perspective view of an interior of a flanged ring 112, illustrating the flanged ring 112 can include a threaded inner surface for a tighter mating with another flanged ring 112 or the cap 112 that includes a mating threaded outer surface.

Various numbers of bladders can be provided one within another, and various numbers of support plates can be provided one on top of another, to accommodate various size riders, riding conditions, and riding applications. In one preferred embodiment, a seat is easily reconfigurable from one modality (i.e. light street riding) to another modality (i.e. heavy off-road riding) simply by adding or removing support plates and/or bladders and their associated flanged rings.

Figure 3:
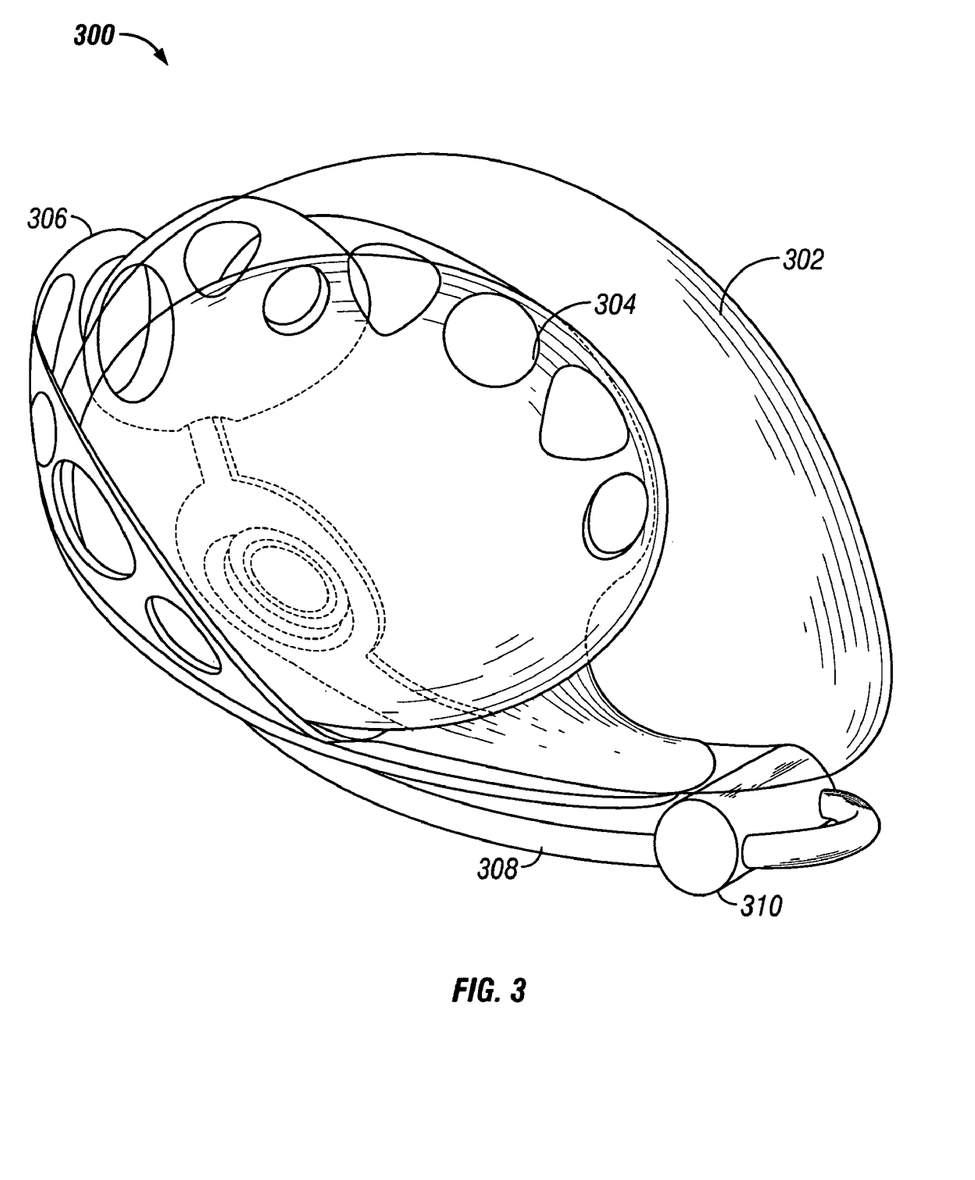
FIG. 3 is a side perspective view of a two bladder seat configuration having an outer bladder and an inner bladder.

FIG. 3 is a side perspective view of a two bladder seat configuration 300 having an outer bladder 302 and an inner bladder 304, and a single layer of interconnected and partially overlapping support plates 306. This configuration 300 is suitable, for example, for comfort and light riding. The seat shown in this configuration 300 also includes mounting rails 308 or other mounting mechanism on which the seat is mounted to a bicycle by a clamp or other device. The mounting rails 308 may include a rigid or semi-rigid nose 310 provided on a front end of the rails 308 to prevent slipping of the seat or for safety of the rider. The nose 310 allows a user to rest the nose of the seat on the side of their leg to support the side-to-side motion of the bike, which supports the user when standing and/or while going fast down a hill.

Figure 4:
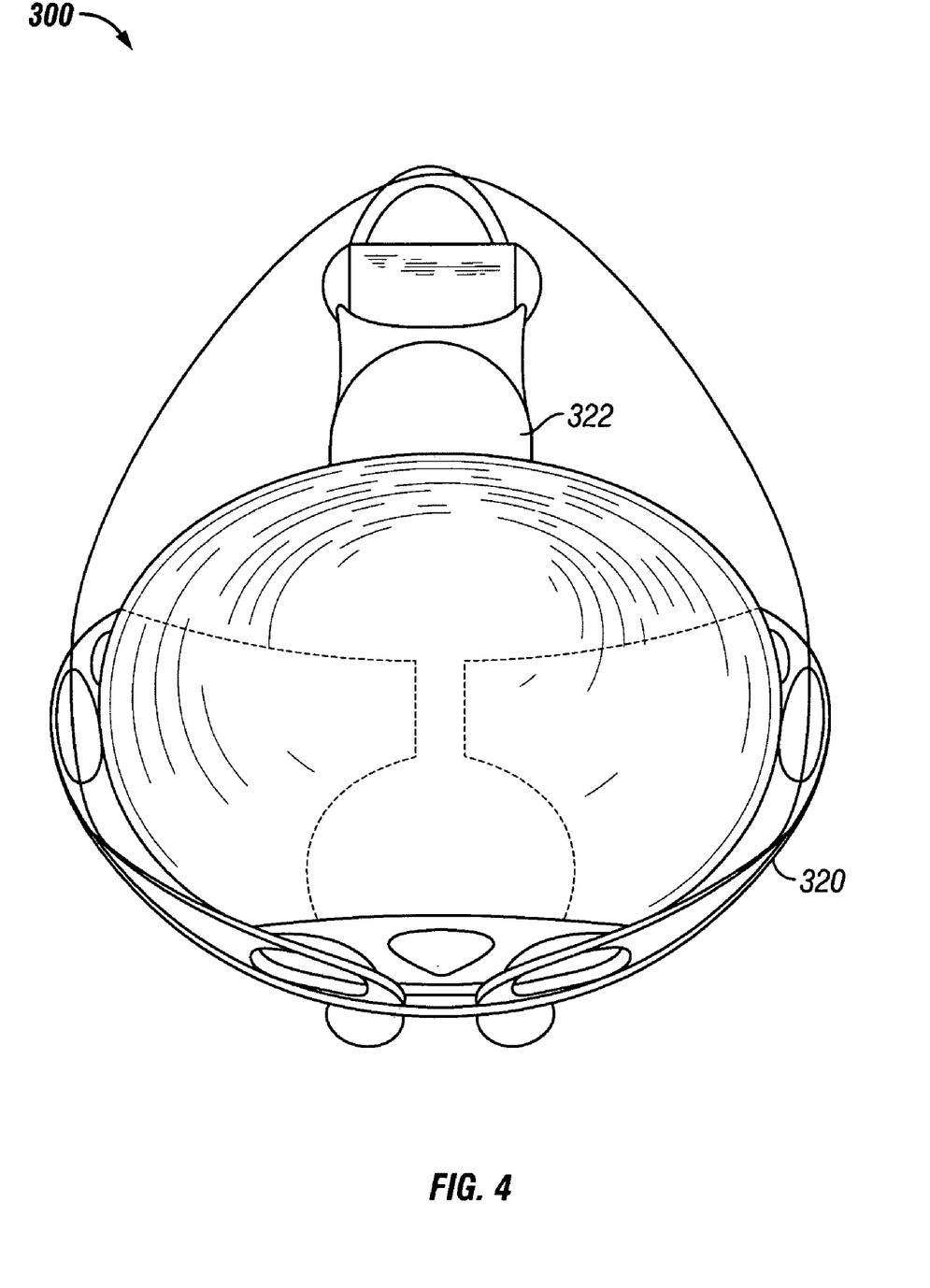
FIG. 4 is a top perspective view of the two bladder seat configuration, showing the fit of the inner bladder within the support mechanism and base.

FIG. 4 is a top perspective view of the two bladder seat configuration 300, showing the fit of the inner bladder within the support mechanism 320 and base 322 thereof. This perspective also illustrates the symmetry of each bladder and relative positioning between the bladders. This positioning is provided for maximum shock absorbent efficiency, as a rider's weight is distributed largely on the outer bladder surface directly over the inner bladder. In an embodiment, the outer bladder can be inflated to a particular relative low pressure, or have a relatively thinner skin than the inner bladder. The inner bladder can be inflated to a relatively higher pressure, or have a thicker skin than the outer bladder. Accordingly, FIG. 4 also shows how the inner bladder fits snugly within the side support plates of the support mechanism 320, allowing the raising or lowering, or increase or decrease in number, of the side support plates of the support mechanism 320 to regulate how much side-to-side movement of the inner bladder (i.e. the medium size bladder) is allowed.

Figure 5:
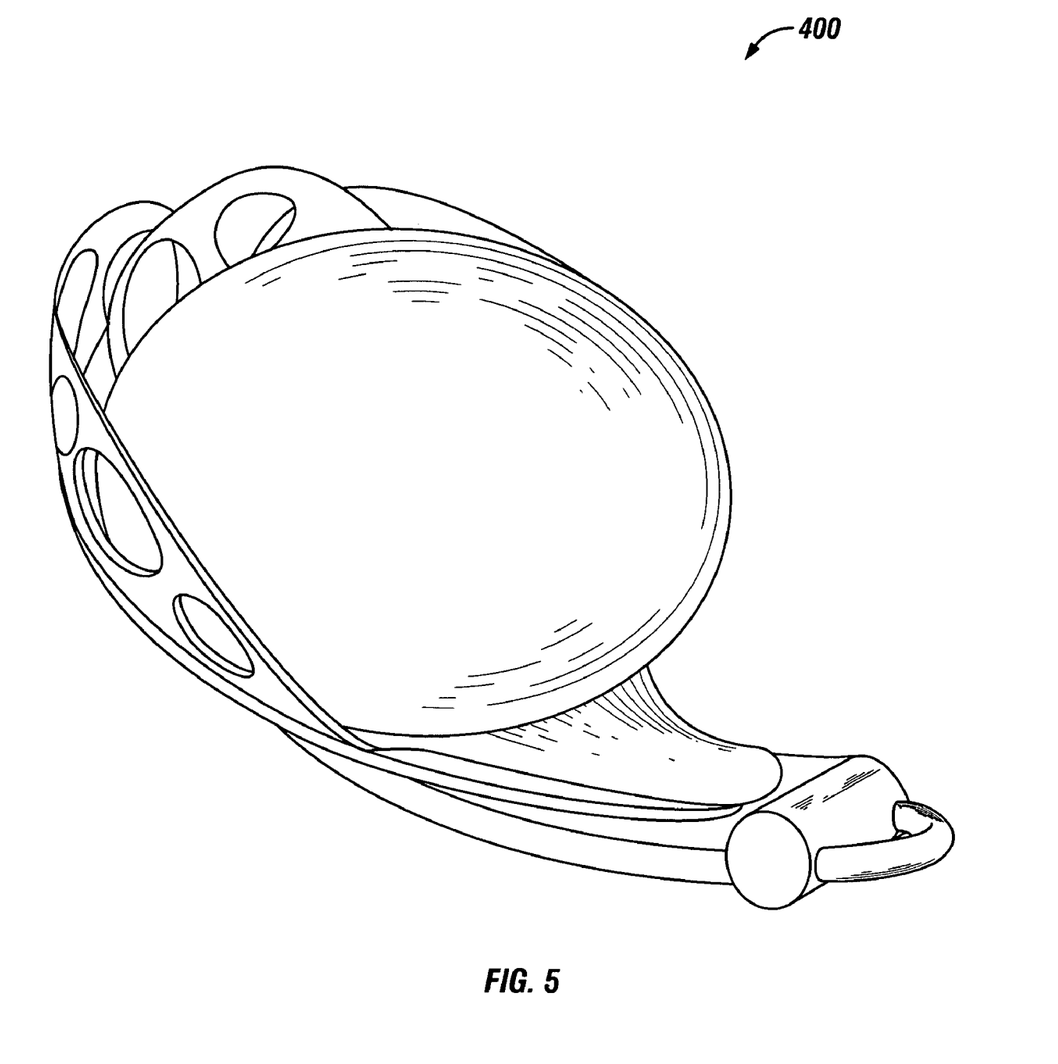
FIG. 5 shows another embodiment of a seat in a one bladder configuration.
Figure 6:
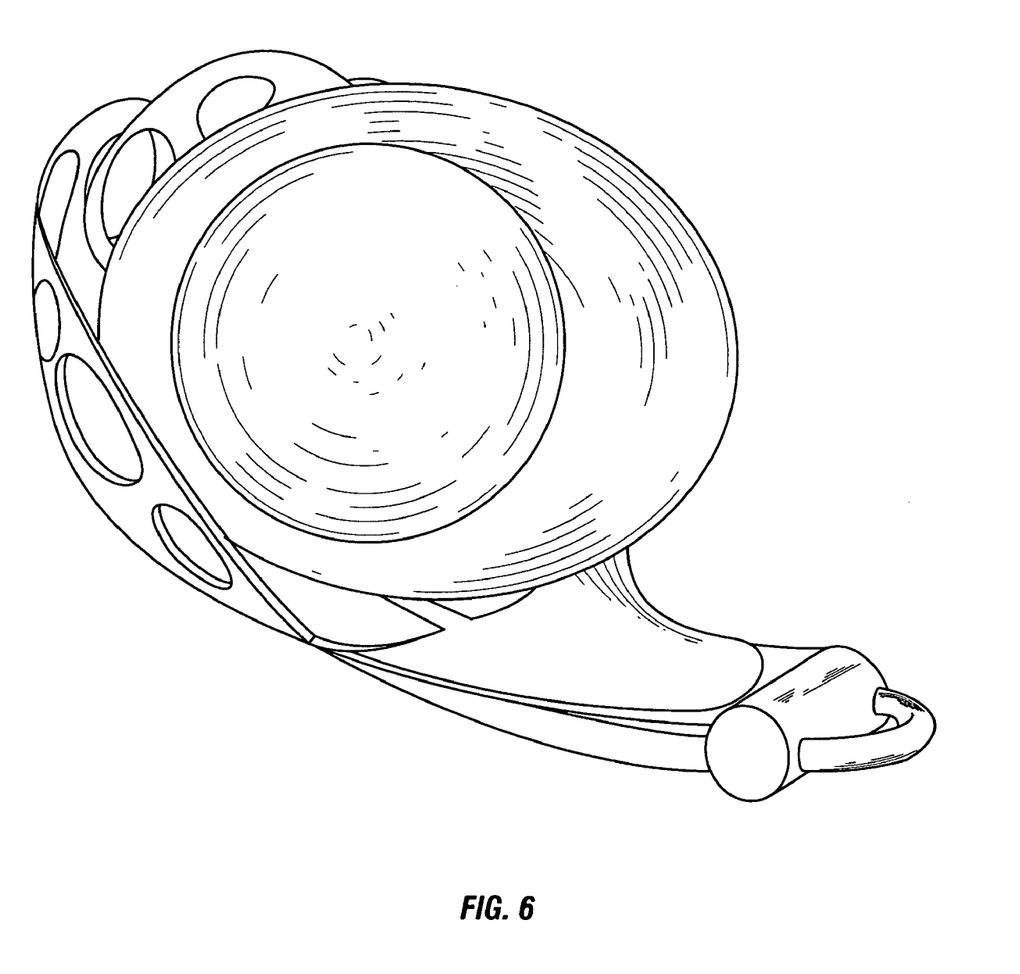
FIG. 6 shows an embodiment in which an outer bladder is oblong and an inner bladder is more spherical, for concentrated and/or targeted shock absorption.

FIG. 5 shows another embodiment of a seat, in a one bladder configuration 400 that can be used for competitive riding or for touring bike riders who need zero resistance to the legs. This configuration can employ a single, relatively inelastic pneumatic bladder that has greater puncture resistance for use with any number of support plates. The bladders can also be shaped for a particular riding mode. For example, the bladders shown in FIGS. 3-5 are generally oblong or egg-shaped. FIG. 6 shows an embodiment in which an outer bladder is oblong, but an inner bladder is more spherical for targeted shock absorption. Accordingly, the bladders may be formed of any shape, or have one or more protrusions.

Figure 7:
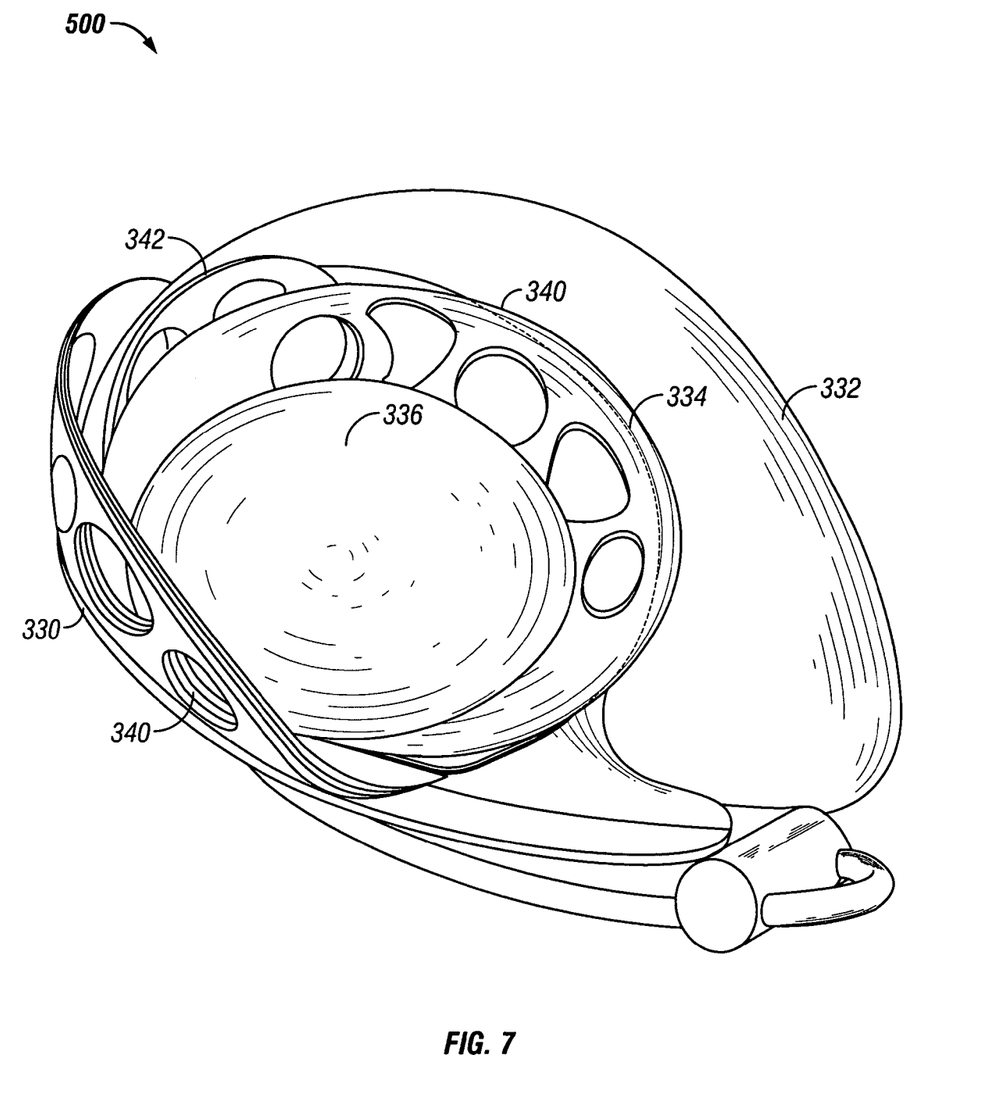
FIG. 7 is a side perspective view of a three-bladder seat configuration having an outer bladder, an intermediate bladder, and an inner bladder.

FIG. 7 is a side perspective view of a three-bladder seat configuration 500 having an outer bladder 332, an intermediate bladder 334, and an inner bladder 336. As described above, each bladder may be inflated to a different pressure, or have a skin of higher or lower elasticity, all of which may be adapted for a specific riding activity. For example, the use of higher elasticity bladders can accommodate a riding activity in an environment with a number of large shocks. The configuration 500 also includes a support basket having three layers of stacked support plates 330 that at least partially cup the bladders.

Figure 8:
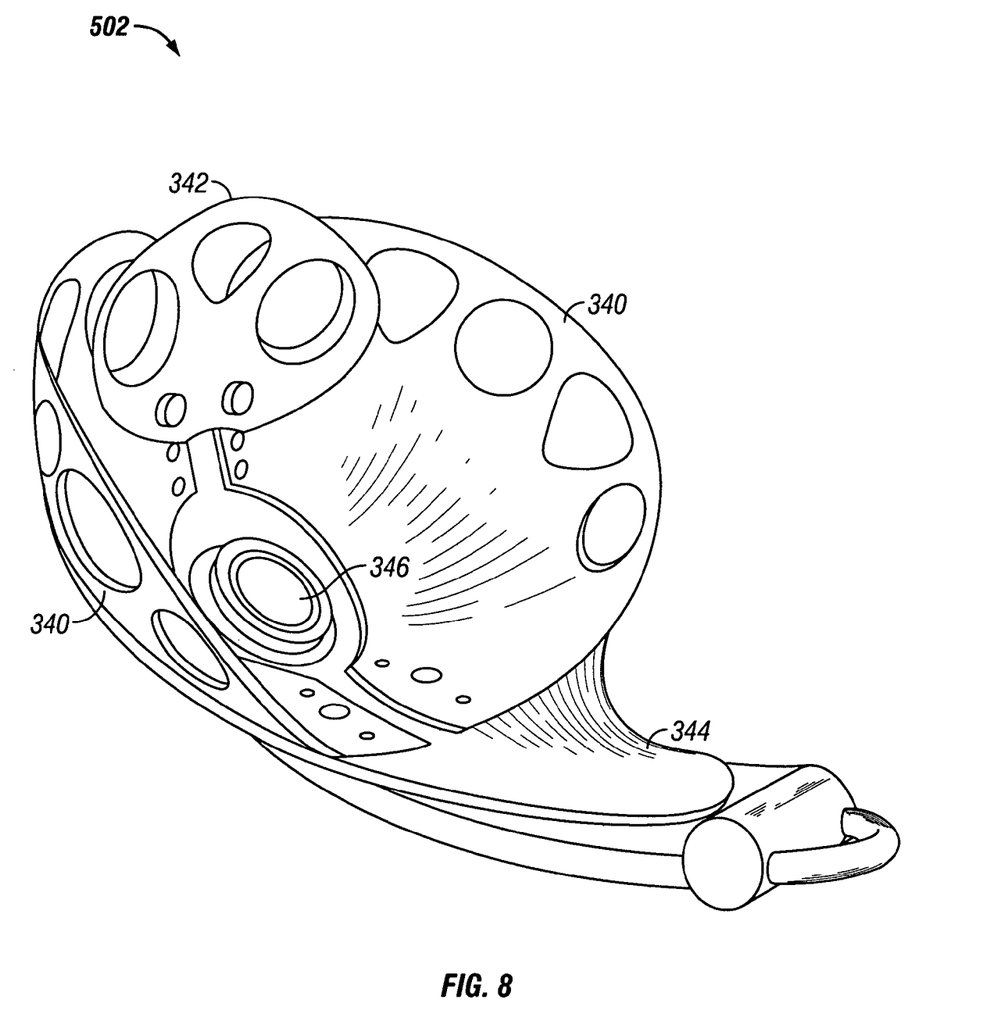
FIG. 8 shows a support basket having opposing curved side support plates connected to a rear support plate.

In the configuration 500 of FIG. 7, side support plates 340 are stacked three-deep on one another, and connect to and partially overlap a double-layered rear support plate 342. Accordingly, any number or configuration of support plates may be used. FIG. 8 shows a support basket 502 without bladders, having opposing curved side support plates 340, each side support plate connected to a rear support plate 342. The side support plates 340 are also connected to a base plate 344. In an embodiment, the base plate 344 includes an aperture 346 in which a pneumatic regulator assembly is connected. In the example shown, the base plate 344 is elongated in a longitudinal, forward direction. Each of the support plates are preferably curved such that when interconnected, curve gently inward to form a bowl or basket shape.

Figure 9:
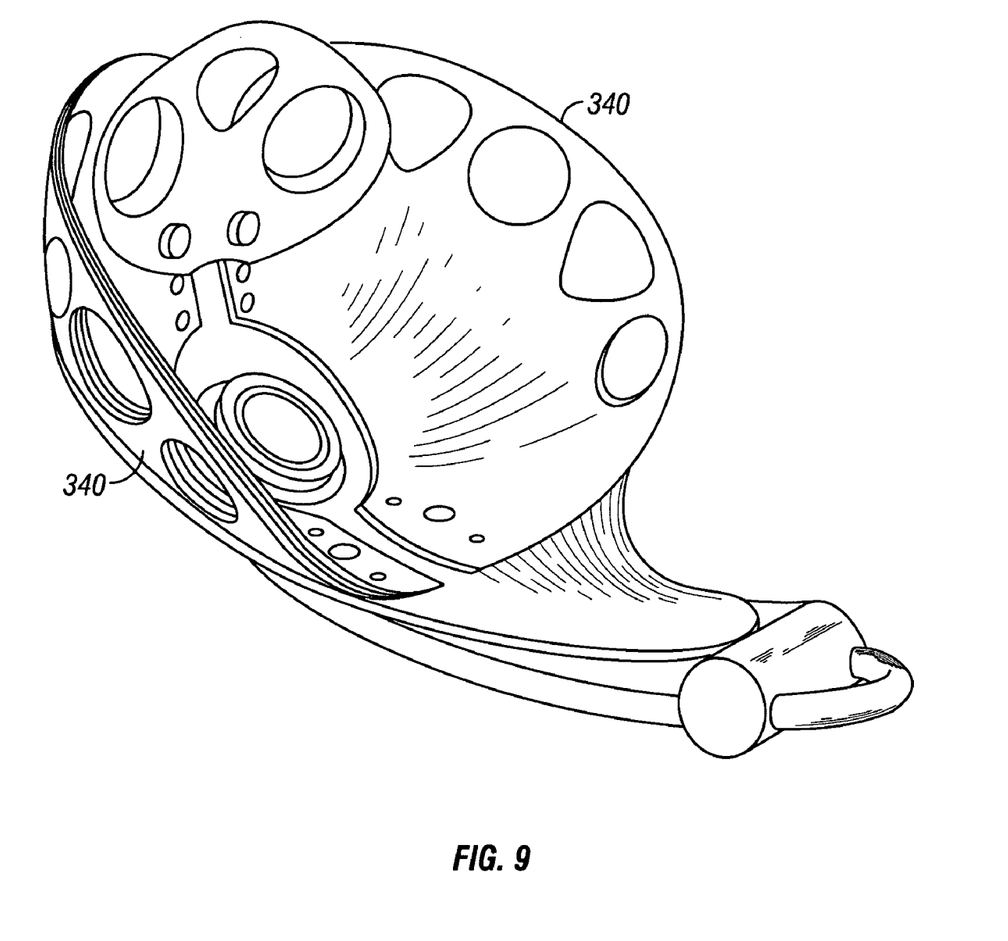
FIG. 9 illustrates an alternative embodiment having three stacked side support plates for withstanding greater forces of pressure or weight and/or less side-to-side motion.

FIG. 9 illustrates an alternative embodiment having three stacked side support plates for withstanding greater forces of pressure or weight. Each support plate can be formed to withstand a particular amount of weight or force, or have a specific tolerance for bending. For example, each plate may support a maximum of 100 lbs., and thus three plates could support a person weighing up to 300 lbs.

Figure 10:
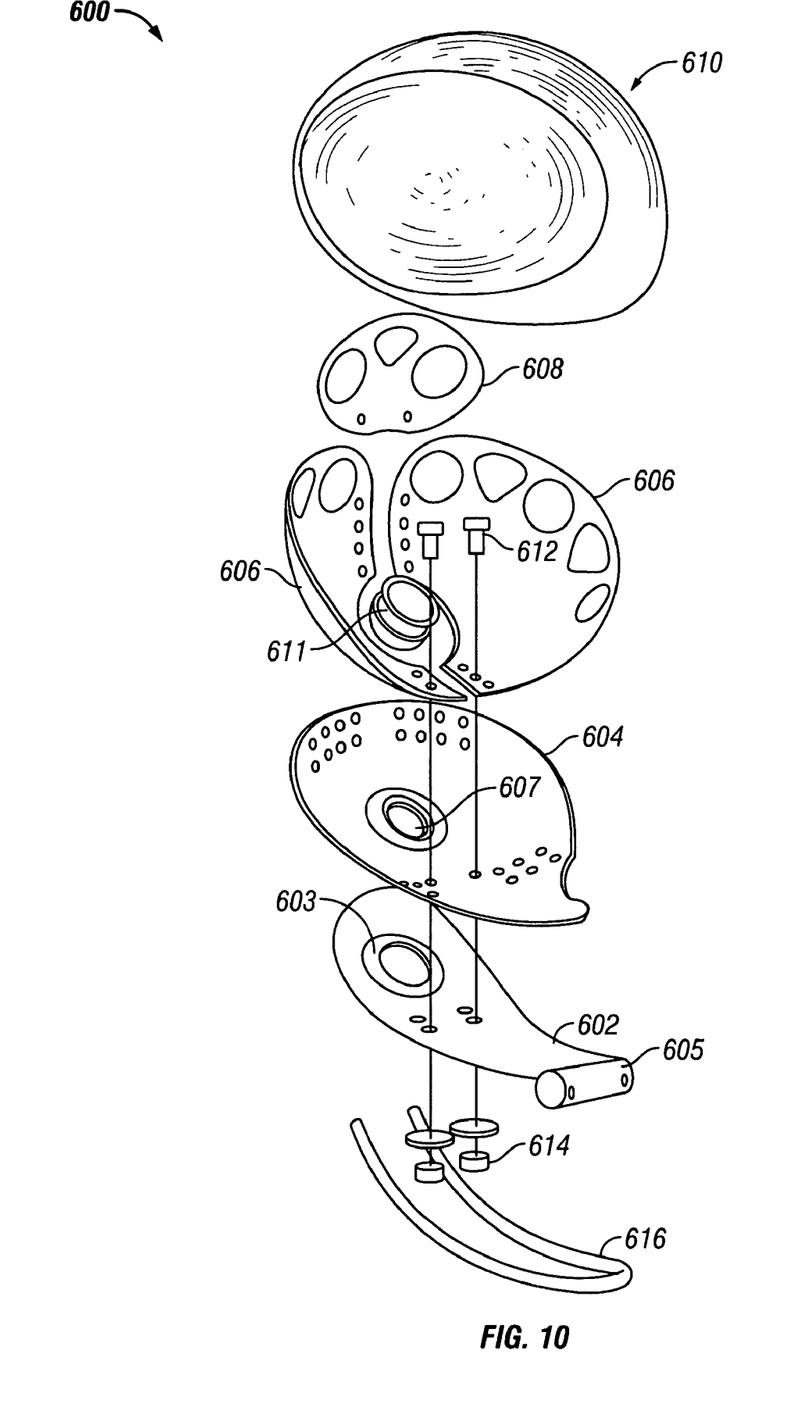
FIG. 10 is an exploded view of a seat support basket for supporting any arrangement of pneumatic seat bladders.

FIG. 10 is an exploded view of a seat support basket 600 for supporting any arrangement of pneumatic seat bladders 610. The support basket 600 includes a base plate arranged in a longitudinal direction. The base plate 602 can include a nose 605 to which the mounting rails 616 can be connected for mounting to the frame of a bicycle. The base plate 602 can be augmented by base attachment plate 604. The base attachment plate 604 includes a plurality of attachment apertures to which one or more support plates 606, 608 can be attached.

The support plates can include one or more stacked side support plates 606, and one or more stacked rear support plates 608 attached to the side support plates 606. Each of the support plates 606, 608 can be arranged such that they curve inward toward an opening 603, 607 in the base plate 602 and/or attachment plate 604, respectively. The opening 603, 607 provides an attachment mechanism to which the pneumatic regulator 611 can be attached or provided. The interconnection and arrangement of the base plate 602, attachment plate 604, side support plates 606 and rear support plate 608 serve to cradle and support one or more inflated bladders 610. All of the plates can be secured together by bolts 612 and/or fasteners 614, or by various other mechanisms, or can be provided in one solid piece. The support plates 606 are used to adjust the potential amount of side-to-side movement and suspension damping, for a rider of a given weight and the desirable amount of shock absorption potential given the terrain and riding style.

Figure 11:
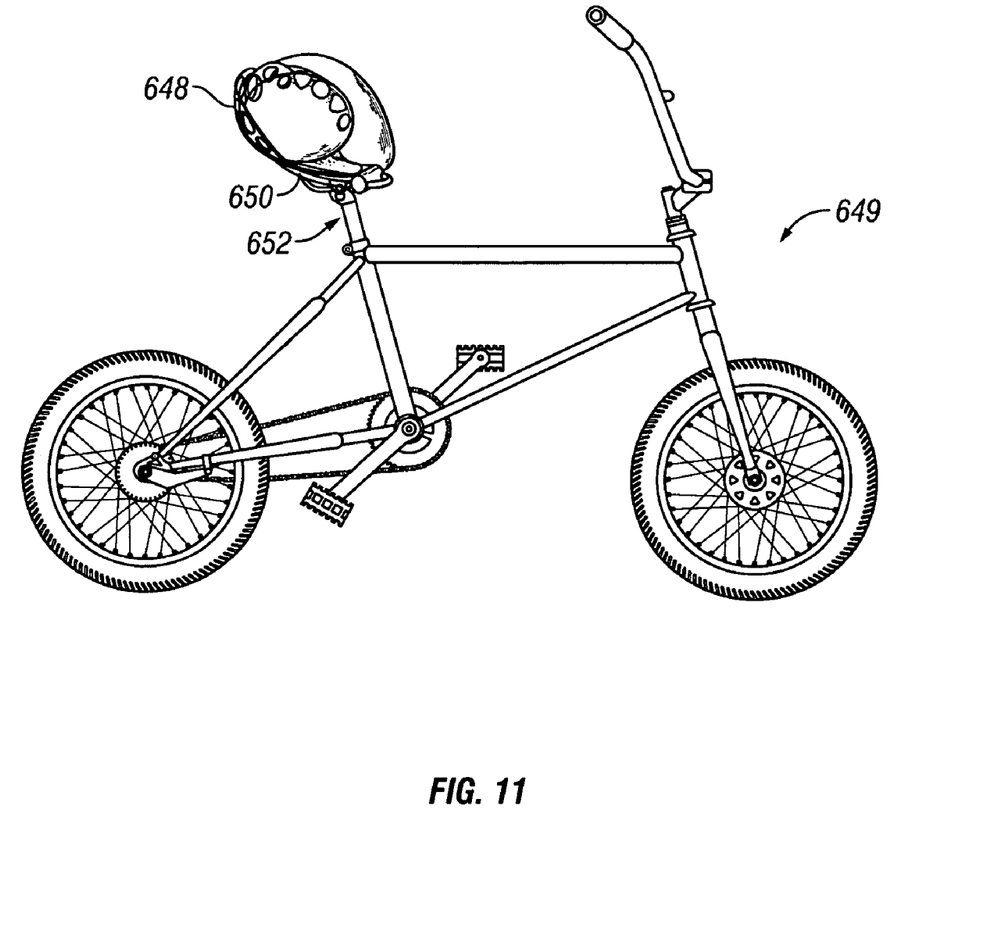
FIG. 11 illustrates one exemplary embodiment of a bicycle having a multiple-bladder seat.
Figure 12A:
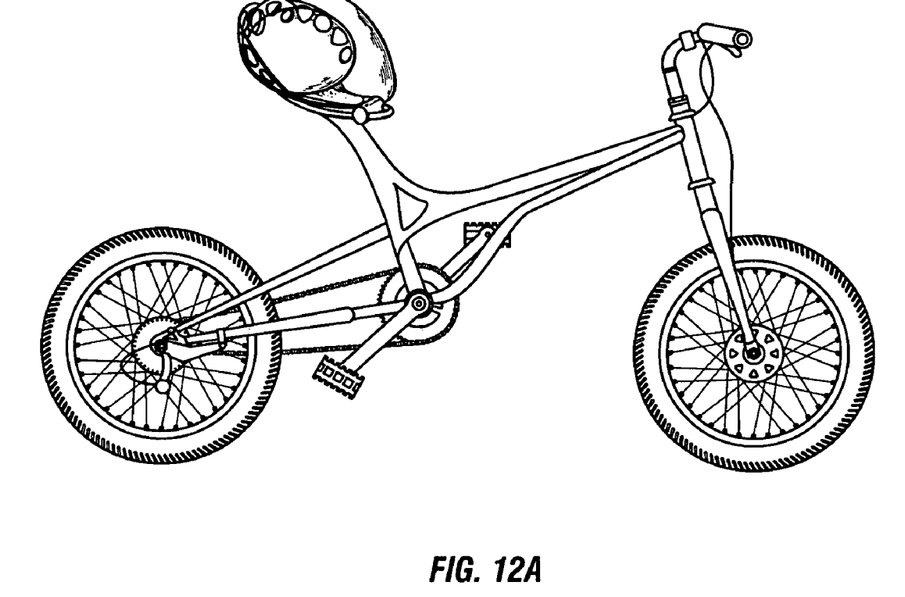
FIGS. 12A and B show alternative exemplary embodiments of a bicycle having several mechanisms for attaching a seat.
Figure 12B:
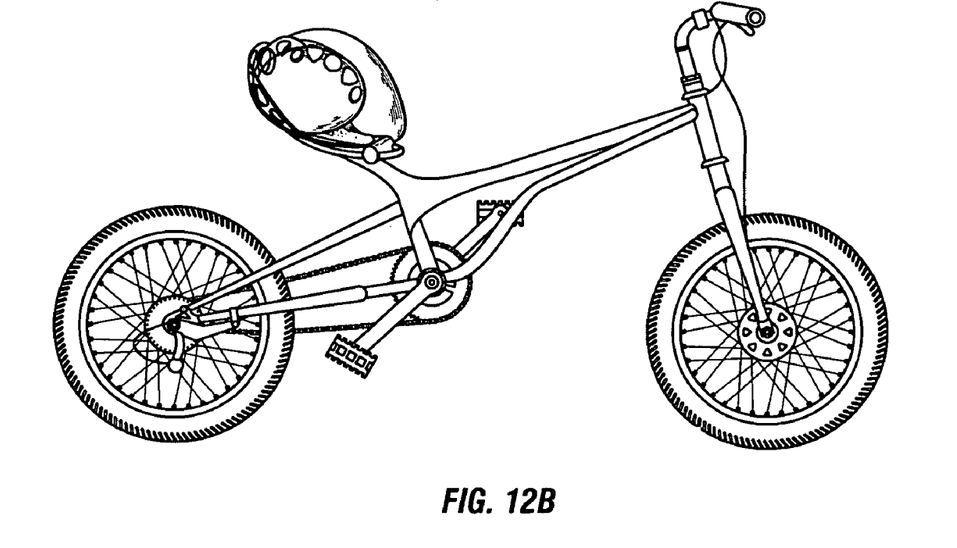

FIG. 11 illustrates one exemplary embodiment of a bicycle having a multiple-bladder seat 648. The seat 648 is connected to the rest of the bicycle by way of a clamp 652 coupled to mounting rails 650, such as found in traditional seats. FIGS. 12A and 12B show alternative exemplary embodiments of a bicycle having several mechanisms for attaching a seat in accordance with the above description, in which the bicycle frame is designed specifically for use with the seat 648, where the bicycle frame is configured to replace many parts of the seat's support.

The seat and bladder assembly described above is designed to offer a user the maximum amount of useable suspension. At the beginning of a compression, the outermost bladder can be as soft and compressible as possible, while near the end of the compression, the innermost bladder can be relatively harder and more supportive. Accordingly, the support and compressibility can be targeted, and directed increasingly during the compression to the center of the assembly in a manner corresponding to the density of tissue of the user. The use of multiple bladders also provides backup support and suspension should one of the bladders rupture. The bladders can be replaced quickly and efficiently, and tuned to the weight of the user and/or the activity in which the seat is being used.

Although a few embodiments have been described in detail above, other modifications are possible. Other embodiments may be within the scope of the following claims.

The invention claimed is:

1. A seat for a vehicle, comprising:
a bladder assembly having a plurality of pneumatic bladders arranged one within another;
a mounting mechanism for mounting the bladder assembly to the vehicle; and
a support basket that at least partially cradles the bladder assembly, the support basket comprising a plurality of at least partially overlapping, flexible curved support plates.

2. A seat in accordance with claim 1, wherein each pneumatic bladder has a compressibility that is at least partially independent of a compressibility of all other pneumatic bladders.

3. A seat in accordance with claim 2, wherein the compressibility of each pneumatic bladder is based at least in part on a pressure within the pneumatic bladder.

4. A seat in accordance with claim 2, wherein the compressibility of each pneumatic bladder is based at least in part on a thickness of an outer layer that defines the shape of the pneumatic bladder.

5. A seat in accordance with claim 1, wherein the plurality of pneumatic bladders includes an inner bladder and an outer bladder; and wherein the inner bladder has a first compressibility and the outer bladder has a second compressibility.

6. A seat in accordance with claim 1, wherein at least one support plate includes one or more apertures for providing a flexible yield against pressure from the bladder assembly.

7. A seat in accordance with claim 1, further comprising a pneumatic regulator assembly coupled with the bladder assembly.

8. A seat for a vehicle, comprising:
a bladder assembly having a plurality of pneumatic bladders arranged one within another;
a mounting mechanism for mounting the bladder assembly to the vehicle; and
a pneumatic regulator assembly coupled with the bladder assembly,
the pneumatic regulator assembly including a plurality of stackable flanged rings, one flanged ring for each of the plurality of bladders, each flanged ring having a first annular portion of a first diameter, a second annular portion of a second diameter larger than the first diameter, and an annular flange projecting from the first portion, wherein the first annular portion of one flanged ring is configured to mate into the second annular portion of another flanged ring, and wherein the annular flange is configured for being circumscribed by an opening of a pneumatic bladder.

9. A seat in accordance with claim 8, wherein the pneumatic regulator assembly further includes a cap that is securable to one of the flanged rings to cover the first annular portion and to secure the opening of the pneumatic bladder to the annular flange, the cap having an air passage for receiving gas or fluid pressure to inflate the pneumatic bladder.

10. A seat for a vehicle, comprising:
two or more pneumatic bladders, at least one pneumatic bladder contained within at least one other pneumatic bladder, and wherein each pneumatic bladder has a compressibility that is at least partially independent of a compressibility of all other pneumatic bladders;
a mounting mechanism for mounting the two or more pneumatic bladders to the vehicle; and
a support basket that at least partially cradles the outermost pneumatic bladder, the support basket comprising a plurality of at least partially overlapping, flexible curved support plates.

11. A seat in accordance with claim 10, wherein the support basket further comprises a base plate connected to the plurality of the support plates.

12. A seat in accordance with claim 11, further comprising one or more mounting rails connected with the base plate and configured for being mounted to the frame of a bicycle.

13. A seat assembly, comprising:
a plurality of bladder systems, each bladder system comprising:
a flanged ring having a first annular portion of a first diameter, a second annular portion of a second diameter larger than the first diameter, and an annular flange projecting from the first portion; and
a pneumatic bladder having an opening configured to circumscribe the annular flange and a body configured to extend up through the first and second portions of the flanged ring; and
wherein the pneumatic bladders are arranged one within another to provide at least one inner bladder and at least one outer bladder.

14. A seat assembly in accordance with claim 13, further comprising a cap that is securable to the flanged ring associated with the inner bladder to cover the first annular portion and to secure the opening of the inner bladder to the annular flange, the cap having an air passage for receiving gas or fluid pressure to inflate the inner bladder.

15. A seat assembly in accordance with claim 13, wherein the flanged ring includes two or more identical flanged rings in a stacked arrangement, in which a first annular portion of an upper flanged ring is mated with a second annular portion of a lower flanged ring, and wherein the cap is securable to a first annular portion of a bottom flanged ring.

16. A seat assembly in accordance with claim 15, wherein the inner bladder is inflatable independently from the outer bladder.

* * * * *